United States Patent
Tripathi

(10) Patent No.: US 10,572,464 B2
(45) Date of Patent: Feb. 25, 2020

(54) PREDICTABLE ALLOCATION LATENCY IN FRAGMENTED LOG STRUCTURED FILE SYSTEMS

(71) Applicant: HGST, Inc., San Jose, CA (US)

(72) Inventor: Shailendra Tripathi, Fremont, CA (US)

(73) Assignee: INTELLIFLASH BY DDN, INC., Santa Clara, CA (US)

(*) Notice: Subject to any disclaimer, the term of this patent is extended or adjusted under 35 U.S.C. 154(b) by 0 days.

(21) Appl. No.: 15/697,621

(22) Filed: Sep. 7, 2017

(65) Prior Publication Data

US 2019/0057121 A1 Feb. 21, 2019

Related U.S. Application Data

(60) Provisional application No. 62/546,097, filed on Aug. 16, 2017.

(51) Int. Cl.
*G06F 9/30* (2018.01)
*G06F 16/22* (2019.01)
*G06F 16/185* (2019.01)

(52) U.S. Cl.
CPC ........ *G06F 16/2246* (2019.01); *G06F 9/3009* (2013.01); *G06F 16/185* (2019.01)

(58) Field of Classification Search
CPC .......... G06F 9/50; G06F 9/5016; G06F 9/505; G06F 3/0631; G06F 12/02; G06F 12/023
See application file for complete search history.

(56) References Cited

U.S. PATENT DOCUMENTS

| | | | |
|---|---|---|---|
| 7,386,663 B2 | 6/2008 | Cousins | |
| 7,536,693 B1 | 5/2009 | Manczak | |
| 8,706,701 B1* | 4/2014 | Stefanov | G06F 21/64 707/687 |
| 2005/0021923 A1* | 1/2005 | Von Bergen | G06F 12/023 711/171 |
| 2005/0080981 A1* | 4/2005 | Archambault | G06F 9/5066 711/1 |

(Continued)

OTHER PUBLICATIONS

Hao Zhang, In-Memory Big Data Movement, IEEE—Jul. 2015 (Year: 2015).*

(Continued)

*Primary Examiner* — Khoa D Doan
(74) *Attorney, Agent, or Firm* — David R. Stevens; Stevens Law Group

(57) ABSTRACT

A method, system and computer program product for managing a file system includes a plurality of allocation areas of loaded allocation trees to serve a request per file system drive for a transaction group. The system also includes a module configured to move a loaded allocation tree to an unloading tree in the event the loaded allocation tree will not satisfy the request. The system additionally includes a module configured to select and place in a loading tree queue a most eligible unloaded tree based on a weight of each unloaded tree. The system further includes a module to asynchronously process the loading tree queue and an unloading tree queue threads parallel to a storage pool allocator sync process. Allocation areas are attached in a circular ring of loaded allocation trees. Space map trees are converted into fixed size areas for constant latency loading logs and creating index trees.

19 Claims, 5 Drawing Sheets

(56) References Cited

U.S. PATENT DOCUMENTS

| | | | |
|---|---|---|---|
| 2011/0208940 A1* | 8/2011 | Naganuma | G06F 3/0604 |
| | | | 711/170 |
| 2014/0068211 A1* | 3/2014 | Fiske | G06F 11/1456 |
| | | | 711/162 |
| 2014/0351823 A1* | 11/2014 | Jamjoom | G06F 9/50 |
| | | | 718/104 |

OTHER PUBLICATIONS

Likun Liu-ZettaDS: A Light-weight Distributed Storage System for Cluster, IEEE, The 3rd ChinaGrid Annual Conference. (Year: 2008).*

* cited by examiner

PREDICTABLE ALLOCATION LATENCY IN FRAGMENTED LOG STRUCTURED FILE SYSTEMS

CROSS-REFERENCE TO RELATED APPLICATION

This application claims the benefit of the priority date of earlier filed U.S. Provisional Patent Application Ser. No. 62/546,097, titled 'Predictable Allocation Latency in Fragmented Log Structured File Systems' filed Aug. 16, 2017, and is incorporated herein by reference in its entirety.

BACKGROUND OF THE INVENTION

The ZetaByte File System (ZFS) uses a logging mechanism, the ZFS intent log (ZIL) to store synchronous writes, until they're safely written to the main data structure in the memory storage pool. The speed at which data can be written to the ZIL determines the speed at which synchronous write requests can be serviced: the faster the ZIL, the faster most databases, NFS and other important write operations become. Normally, the ZIL is part of the regular memory pool on storage disk. But ZFS offers the possibility to use a dedicated device for the ZIL. This is then called a "log device".

ZFS also has a sophisticated cache called the "Adaptive Replacement Cache" (ARC) where it stores both most frequently used blocks of data and most recently used ones. The ARC is stored in RAM, so each block of data that is found in the RAM can be delivered quickly to the application, instead of having to fetch it again from disk. When RAM is full, data needs to be thrown out of the cache and is not available any more to accelerate reads.

Solid-state arrays (SSA) have moved the external controller-based storage array market from a relatively stagnant incrementally improving market with slow-changing dynamics to a progressive neoclassical market. Improvements in the dynamics of many factors—such as reduced storage administration, power, cooling, rack space, increased performance and density—have changed the accepted assumptions of the previous SAN storage array market. Many vendors design and develop their own custom solid-state solutions. Consequently, more vendors are offering alternate solid-state media form factors with denser and faster systems when they create their own NAND flash storage packaging. From a whole system perspective, the largest SSAs now scale to 3.9 PB, and next-generation SSD technology and interconnects will again redefine performance capabilities, creating demand for faster storage networks.

Neither the solid-state array, nor the storage array administrator is the bottleneck anymore; but network latency has become the challenge. This has extended the requirement and life span for 16 Gbps and 32 Gbps Fibre Channel SANs, as Ethernet-based networks and related storage protocols struggle to keep up. Many new vendors have entered the market who provide comprehensive service management, and along with many traditional storage vendors, they continue to transition their portfolios from HDD-based arrays to all solid-state arrays.

Therefore, an SSA that is two to three times more expensive to purchase becomes a cost-effective replacement for a hybrid or general-purpose array at increased utilization rates. With regard to performance, one SSD can typically replace multiple HDDs, combined with data reduction features and increased storage administrator productivity the price point at which SSA investment decisions are made is dropping rapidly. Redundant array of independent disks (RAID) rebuild times for high-capacity SSDs are also faster than for high-capacity HDDs. Therefore, as HDD storage capacities increase, so do HDD recovery times, and SSAs reduce the risk exposure during any media failure and recovery window. Use cases for SSAs are moving into analytics, file and object workloads, and some customers even use SSAs as backup targets to reduce backup and restore windows.

Price and ownership programs translate into very competitive purchase prices for buyers, but vendors are faced with challenges to becoming profitable as incumbent vendors discount to avoid losing market share and new vendors discount to attract new customers. Because the SSA market has expanded rapidly with SSD reliability being equal to or better than HDD arrays, and feature parity also equalizing, the competitive battle to differentiate has moved to ease of ownership, and remote and pre-emptive support capabilities.

In contrast to block and file I/O storage systems, when an object is stored in Object addressable data storage systems (OAS), the object is given a name that uniquely identifies it and that also specifies its storage location. This type of data access therefore may eliminate the need for a table index in a metadata store and it may not be necessary to track the location of data in the metadata. An OAS receives and processes access requests via an object identifier that identifies a data unit or other content unit rather than an address that specifies where the data unit is physically or logically stored in the storage system.

In OAS, a content unit may be identified using its object identifier and the object identifier may be independent of both the physical and logical locations where the content unit is stored. In other words, the object identifier does not control where the content unit is logically or physically stored. Thus, if a physical or logical location of a content unit changes, the identifier for access to the unit of content may remain the same. Thus, an application program may simply track the name and/or location of a file rather than tracking the block addresses of each of the blocks on disk that store the content.

Many storage systems have separate systems to de-duplicate and compress data and replication software is often added post system build. Server vendors have used available building blocks to slash server prices dramatically, yet storage incumbents continue to overcharge customers for their storage servers. Architectural complexity, non-integrated products, expensive proprietary networking protocols, cumbersome administration and licensing for every module of software are the norm and burden storage consumers with high prices and high maintenance.

Modern computing ecosystems rely on resilient data availability for most of their functions. This translates directly into failure-resilient storage systems, which have fostered the development of strategies in storage server solutions like clustering (multiple computers per file system), shared storage, and splitting of compute and filesystem responsibilities. Simultaneously, the network filesystem protocols like CIFS (Common Internet File System) and NFS (Network File System) have undergone modifications that allow applications running on remote clients to receive a seamless flow of data, irrespective of storage node failures at the server. This is primarily achieved by making the storage server cluster guarantee that once a client acquires a handle on a file by opening it, the cluster and not a specific node will honor client interactions for this file-handle. This guarantee has major implications to the manner in which client's file-handle data must be stored on a storage server.

In a traditional storage server, the storage host node, which services the client's request for opening a file, creates an in-memory context for the client's request to open the file and refers to it for all further client operations using the file-handle that it returns to the client as a part of an open response till the client relinquishes the file-handle, typically through a file-close.

This in-memory context, or client's file-handle info, can be grouped into the following categories. Mode of usage: The manner in which the client wishes to use the file, e.g. read, write, execute, delete etc. Mode of shared usage: The manner in which the client allows other clients to use this file concurrently. Locking information: The extent of the file over which the client wishes exclusive access. This state may also contain information about any soft-lock or opportunistic lock that the client holds for caching read and writes to the file locally. Any application specific context that the client wishes to save as opaque metadata for the lifetime of the file-handle.

For a failure-resilient storage system, this in-memory state, referred to as 'persistent-handle-info' or PHDL-info hereafter, must be made available to other nodes of the system, so that in the event of primary node failure, any other node in the storage cluster can serve the data to clients once the latter present their persistent-handles for reconnection. However, storing the persistent-handle-info for long time-intervals can cause considerable memory consumption on the storage server.

SUMMARY OF THE INVENTION

A disclosed method for managing a file system comprises assessing a plurality of allocation areas including loaded allocation trees to serve a request per file system drive for a next transaction group. The method also includes moving a loaded allocation tree to an unloading tree in the event the loaded allocation tree will not satisfy the request. The method additionally includes selecting and placing in a loading tree queue a most eligible unloaded tree based on a weight of each unloaded tree. The method further includes asynchronously processing the loading tree queue and an unloading tree queue via threads running parallel to a storage pool allocator sync process.

A non-transitory processor-readable storage medium is disclosed having one or more instructions which when executed by at least one processing circuit causes the at least one processing circuit to manage a file system, the instruction which when executed by at least one processor causes the processor to assess a plurality of allocation areas including loaded allocation trees to serve a request per file system drive for a next transaction group. The instruction executed by the at least one processor also causes the processor to move a loaded allocation tree to an unloading tree in the event the loaded allocation tree will not satisfy the request. The instruction additionally causes the processor to select and place in a loading tree queue a most eligible unloaded tree based on a weight of each unloaded tree. The instruction further causes the processor to asynchronously process the loading tree queue and an unloading tree queue via threads running parallel to a storage pool allocator sync process.

A system for managing a file system comprises as disclosed herein a module configured to assess a plurality of allocation areas of loaded allocation trees to serve a request per file system drive for a transaction group. The system also includes a module configured to move a loaded allocation tree to an unloading tree in the event the loaded allocation tree will not satisfy the request. The system additionally includes a module configured to select and place in a loading tree queue a most eligible unloaded tree based on a weight of each unloaded tree. The system further includes a module to asynchronously process the loading tree queue and an unloading tree queue threads parallel to a storage pool allocator sync process.

Other aspects and advantages of embodiments of the disclosure will become apparent from the following detailed description, taken in conjunction with the accompanying drawings, illustrated by way of example of the principles of the disclosure.

Figure 1:
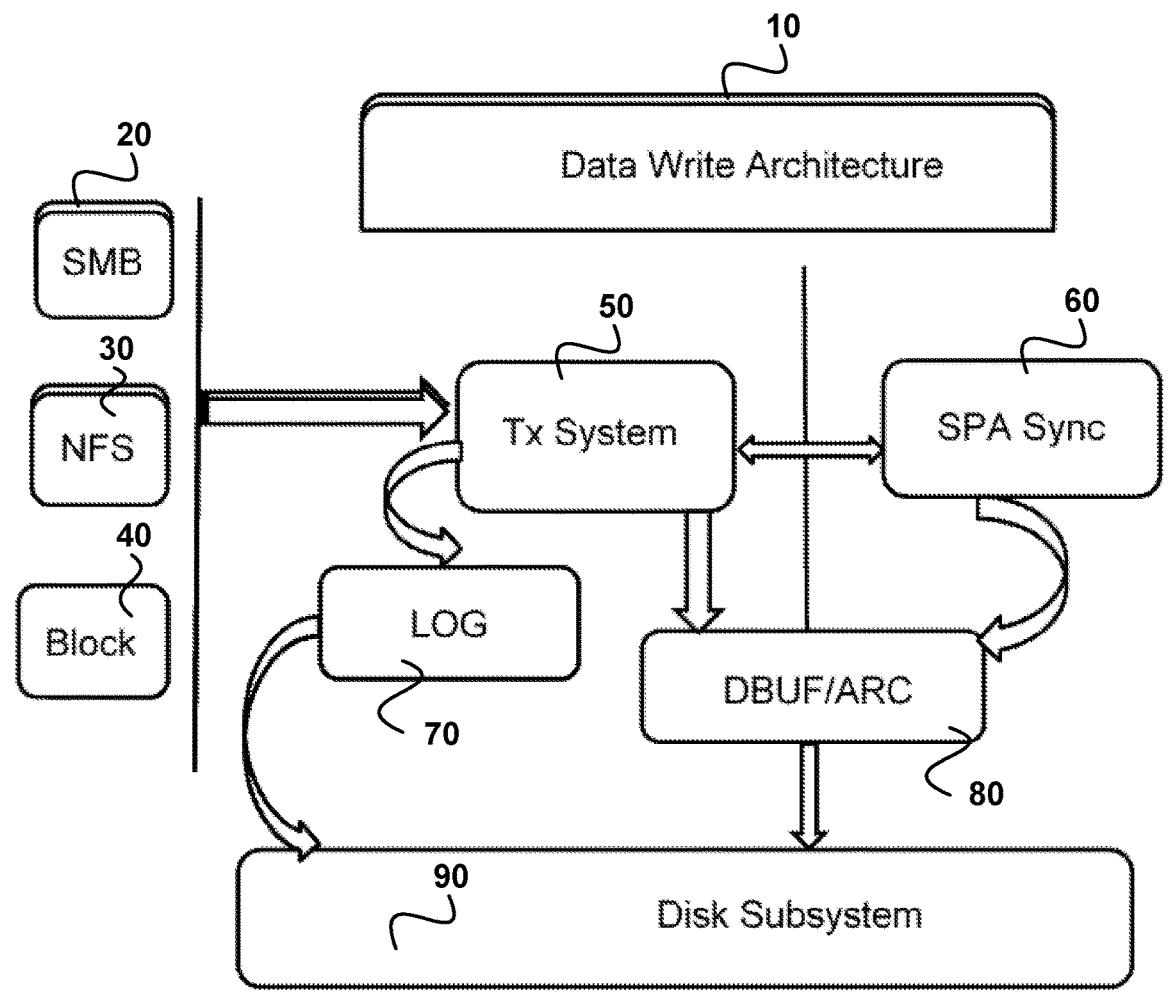
FIG. 1 depicts a block diagram of space map allocation trees in accordance with an embodiment of the present disclosure.

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

The term 'sync' is an abbreviated form of the term 'synchronization.' Similarly the term, "async" is an abbreviated form of the term 'asynchronization.' Since storage pool allocator (SPA) is commonly referred to in the acronym form, a spa_sync is therefore a synchronization of the storage pool allocator. The acronym RAID is defined as a redundant array of independent disks and is a data storage virtualization technology that combines multiple physical disk drive components into a single logical unit for the purposes of data redundancy, performance improvement, or both.

Log structured filesystems never write in-place. Therefore, random writes are converted into sequential writes ideal for optimal performance on most storage media. However, in this mode, every over-write results in a small area being freed randomly. Thus, the log-structured mechanism is by design fragmenting. As the File System gets filled up, finding appropriate allocation starts getting expensive and the time to get the right fragment grows linearly expressed as O(n) where n is the total fragments, exceeding all limits for normal response time expected. Ideally, the allocation latency should be O(1) for predictable latency even in a fragmented system.

Allocation areas are chunked in segments. The allocation and free space is maintained in the log as a series of allocated and free records. This scheme is an extension of log based operations which convert random I/Os (caused mainly by free space) to serialized I/Os. In run time, an index tree is maintained which tracks the free region based on these logs. Since, these logs cannot be maintained in memory for the big data pool, the tree is unloaded. In the conventional mechanism, allocation logs are loaded and an index tree is created. Only after loading are allocation requests served. This design is a source linear latency when system memory gets fragmented. Additionally, the loaded tree may not satisfy the requests so that it can issue another load.

FIG. 1 depicts a block diagram of the data flow architecture for the write path in accordance with an embodiment of the disclosure. Disclosed File Systems use higher performance storage media for logging in-flight operations. The client I/O interacts with the transaction subsystem to make the changes in-memory and the transaction along with the data persisted in the log. The client I/O is acknowledged as done at this point because the data can be recovered from the log at any point of time with persisted log headers and data.

As depicted in FIG. 1, data from SMB (server message block) 20 operates as an application-layer network protocol mainly used for providing shared access to files, printers, and serial ports and miscellaneous communications between nodes), NFS (network file system) 30 allows a user on a client computer to access files over a computer network much like local storage is accessed), and Blocks 40 is presented to the Tx (Transaction) System 50. The client (a desktop computer or workstation that is capable of obtaining information and applications from a server) I/O interacts with the transaction subsystem to make the changes in-memory and the transaction along with the data persisted in the log. The client I/O is acknowledged as done at this point because the data can be recovered from the log at any point of time with persisted log headers and data. The Log 70 comes from the Tx System 50 to the Disk Subsystem. The DBUF (data management buffer) and the ARC (Adaptive Replacement cache) 80 take input from the Tx A new architecture has been created to leverage the internal workings of each File System. The File System collects a set of transactions in a transaction group. The allocation requests arise when a transaction group is persisted (SpaSync process).

Figure 2:
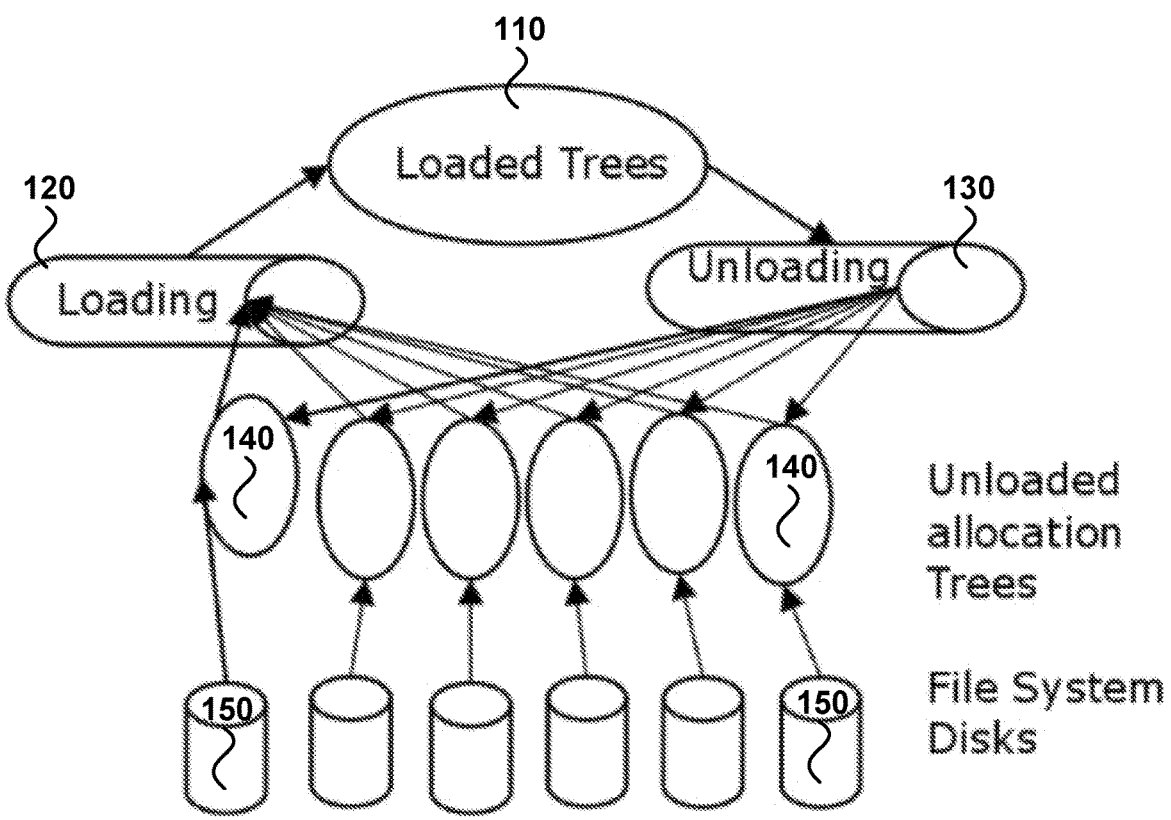
FIG. 2 depicts an exemplary relationship of unloaded allocation trees to unloading, loading and loaded trees in accordance with an embodiment of the present disclosure.

FIG. 2 depicts a block diagram of space map allocation trees in accordance with an embodiment of the present disclosure. Allocation areas, called space map trees, are converted into fixed size areas. The fixed size provides constant latency for loading the logs and creating the index trees. The space map allocation trees are grouped into 4 subsets—Unloaded allocation trees 140, a Loading tree 120, a Loaded tree 110, and an Unloading tree 130. File system disks 150 comprise the unloaded allocation trees 140.

The loaded tree 110 consists of the allocation trees from all the drives currently loaded. The loaded tree 110 from all the file system devices are attached in a circular ring model as depicted.

Unloaded trees 140 are independent to the device and represent all the trees which are not loaded on the given device. Loading/Unloading trees 120 and 130 group and contain the space maps being loaded/unloaded.

A new infrastructure has been created to find out how much space is needed to service a spa sync process. When the transaction is added, it tracks the storage space required and their sizes. It also computes the metadata space required as well.

When one transaction group finishes, loaded trees are assessed if they have trees which can serve a request per drive for the next open transaction group based on the above infrastructure. Based on the recent and historical requirements, all the loaded trees are assessed, and, if a loaded tree will not satisfy the requests, it is moved to an unloading tree. Based on the weights of the unloaded trees, the most eligible tree is selected and placed in the loading tree queue. The loading queue and unloading queue is processed by the asynchronous threads running in parallel to the spa sync process. When an allocation request comes, it first attempts to allocate the request from the loaded tree ring. Thus, if any device can service the request, it does not even go to an un-loaded allocation tree. The load and unload has been made asynchronous and parallelized, so the allocation requests do not initiate inline loads.

Additional infrastructure present and created on the metadata of the space maps are used to sort the unloaded tree. This is a function of space map free area, fragmentation level, and a maximum size segment available in that segment. In an extreme worst case, if the allocation requests could not be serviced in the loaded trees, the infrastructure finds the best space map which can serve the request and returns.

Figure 3:
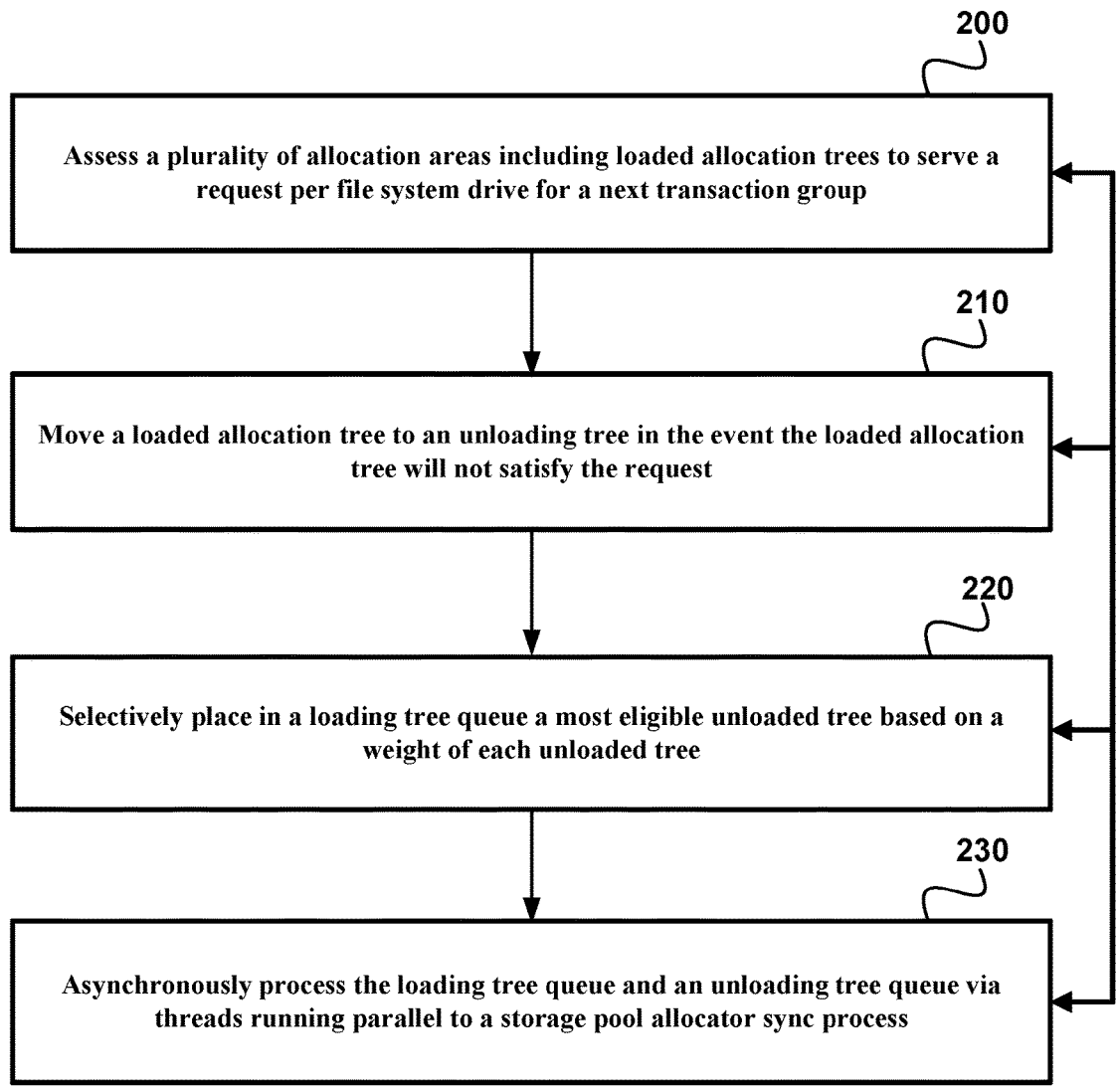
FIG. 3 is a flow chart of a method for Predictable Allocation Latency in Fragmented Log Structured File Systems in accordance with an embodiment of the present disclosure.

FIG. 3 is a flow chart of a method for Predictable Allocation Latency in Fragmented Log Structured File Systems in accordance with an embodiment of the present disclosure. The disclosed method includes 200 assessing a plurality of allocation areas including loaded allocation trees to serve a request per file system drive for a next transaction group. The method also includes 210 moving a loaded allocation tree to an unloading tree in the event the loaded allocation tree will not satisfy the request. The method additionally includes 220 selecting and placing in a loading tree queue a most eligible unloaded tree based on a weight of each unloaded tree. The method further includes 230 asynchronously processing the loading tree queue and an unloading tree queue via threads running parallel to a storage pool allocator sync process.

Figure 4:
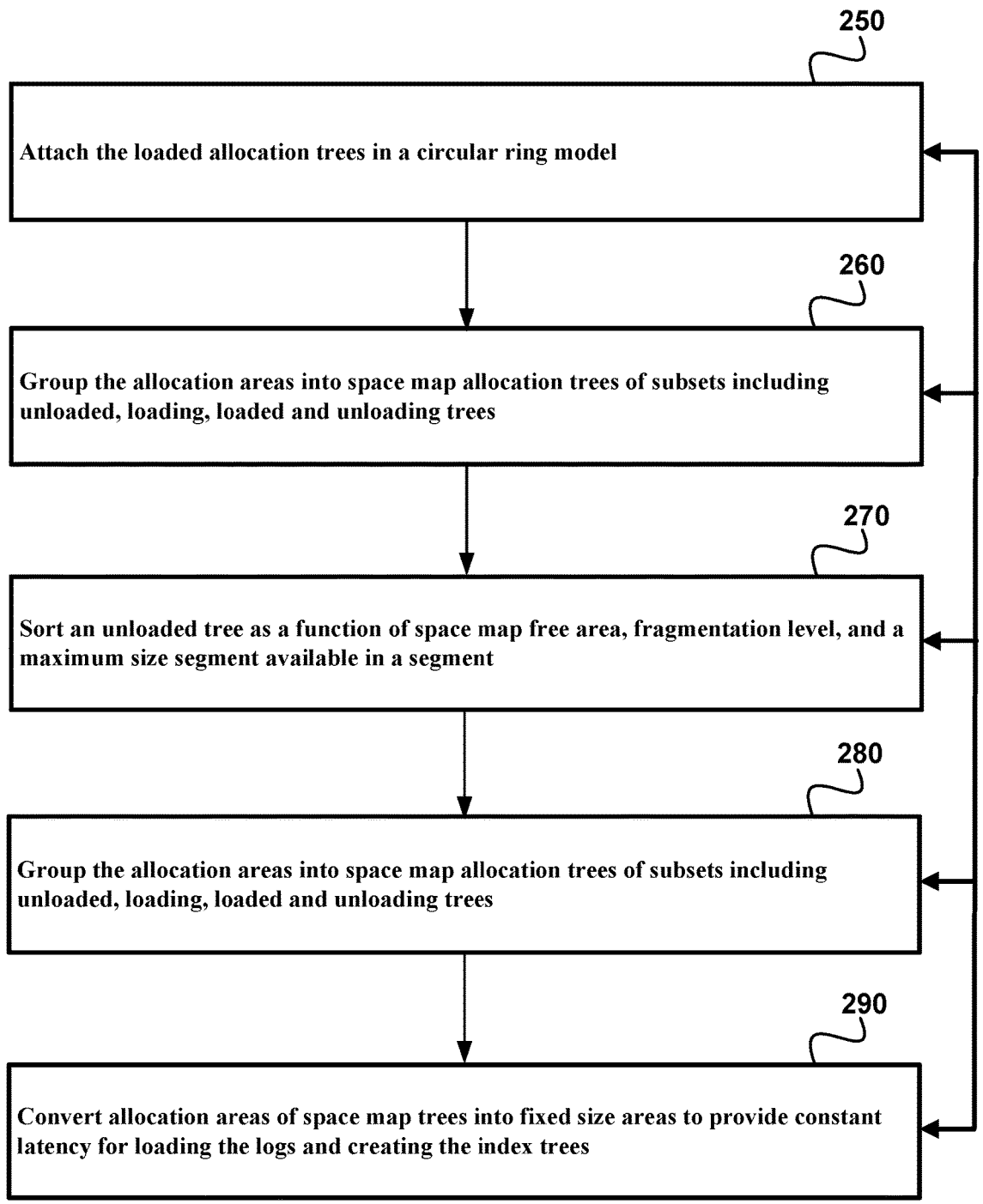
FIG. 4 is another flow chart of a method for Predictable Allocation Latency in Fragmented Log Structured File Systems in accordance with an embodiment of the present disclosure.

FIG. 4 is another flow chart of a method for Predictable Allocation Latency in Fragmented Log Structured File Systems in accordance with an embodiment of the present disclosure. The disclosed method includes 250 attaching the loaded allocation trees in a circular ring model. The disclosed method also includes 260 grouping the allocation areas into space map allocation trees of subsets including unloaded, loading, loaded and unloading trees. The disclosed method additionally includes 270 sorting an unloaded tree as a function of space map free area, fragmentation level and a maximum size segment available in a segment. The disclosed method further includes 280 grouping the allocation areas into space map allocation trees of subsets including unloaded, loading, loaded and unloading trees. The method yet includes 290 converting allocation areas of space map trees into fixed size area to provide constant latency for loading the logs and creating the index trees.

Figure 5:
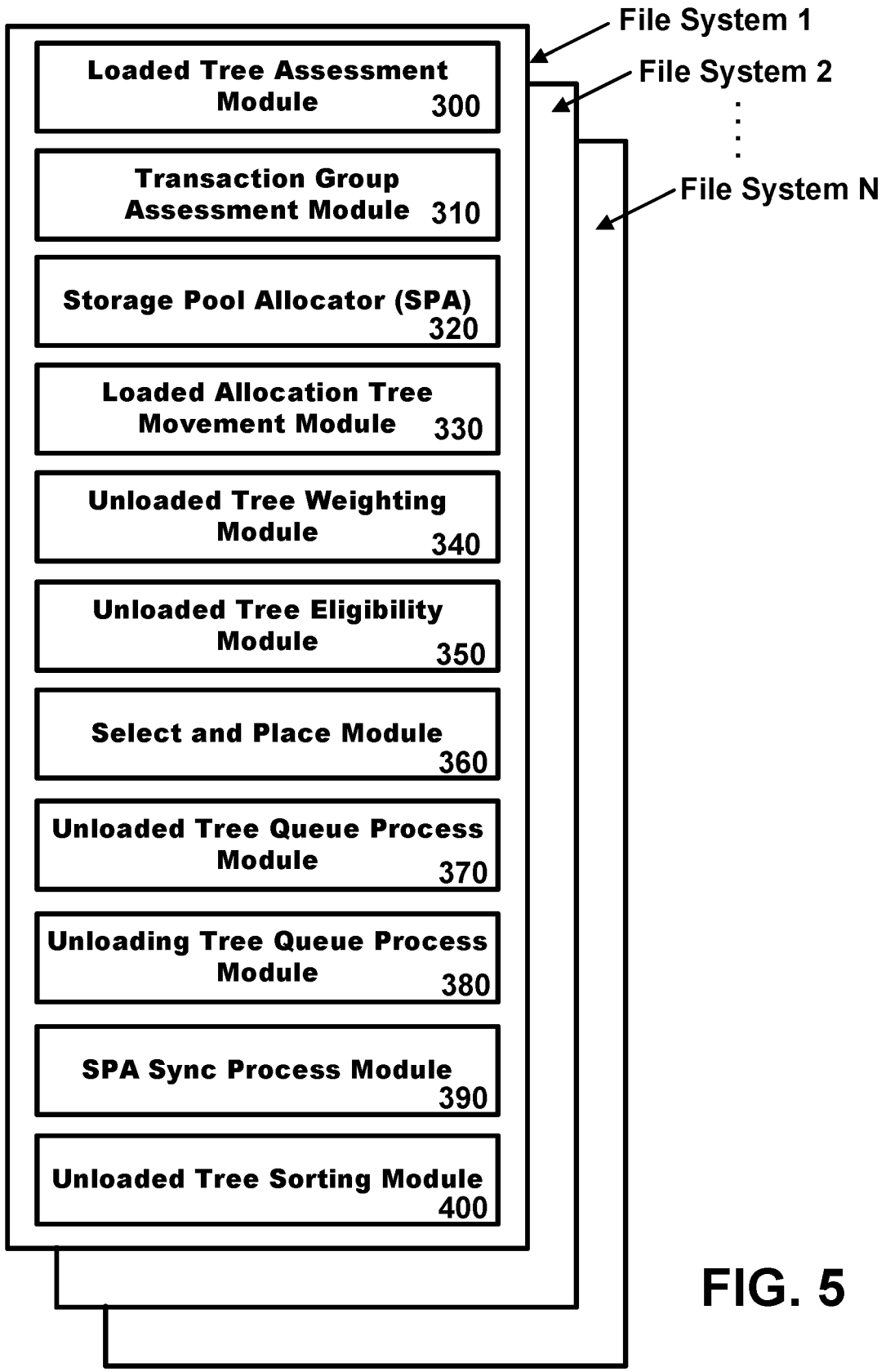
FIG. 5 is a block diagram of the Predictable Allocation Latency in Fragmented Log Structured File Systems in accordance with an embodiment of the present disclosure.

FIG. 5 is a block diagram of the Predictable Allocation Latency in Fragmented Log Structured File Systems in accordance with an embodiment of the present disclosure. The disclosed computer program product system and infrastructure include a 300 loaded tree assessment computer program module, a transaction (txg) group assessment computer program module 310, a storage pool allocator (SPA) 320, a loaded allocation tree movement computer program module 330, an unloaded tree weighting computer program module 340, an unloaded tree eligibility computer program module 350, a select and place computer program module 360, an unloaded tree queue process computer program module 370, an unloading tree queue process computer program module 380, a SPA Sync process computer program module 390 and an unloaded tree sorting computer program module 400.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A method for managing a file system, the method comprising:
   a) assessing a plurality of allocation areas including loaded allocation trees to serve a request per file system drive for a next transaction group;
   b) moving a loaded allocation tree to an unloading tree in the event the loaded allocation tree will not satisfy the request;
   c) selectively placing in a loading tree queue a most eligible unloaded tree based on a weight of each unloaded tree, wherein an unloaded tree is independent to a file system device and represents all trees which are not loaded on the given device; and
   d) asynchronously processing the loading tree queue and an unloading tree queue via threads running parallel to a storage pool allocator sync process.

2. The method for managing the file system of claim 1, further comprising attaching the loaded allocation trees in a circular ring model.

3. The method for managing the file system of claim 1, wherein a loaded allocation tree comprises allocation trees of allocation areas from all the file system devices and drives.

4. The method for managing the file system of claim 1, further comprising determining how much space is needed to service the storage pool allocator sync process.

5. The method for managing the file system of claim 1, further comprising determining how much metadata space is needed to service the storage pool allocator sync process.

6. The method for managing the file system of claim 1, further comprising grouping the allocation areas into space map allocation trees of subsets including unloaded, loading, loaded, and unloading trees.

7. The method for managing the file system of claim 1, wherein allocation requests arise responsive to a transaction group being persisted in a storage pool allocator (SPA) sync process.

8. The method for managing the file system of claim 1, further comprising sorting an unloaded tree as a function of space map free area, fragmentation level, and a maximum size segment available in a segment.

9. The method for managing the file system of claim 1, further comprising finding a best space map which can serve the request in the event the allocation requests could not be serviced in the loaded allocation trees.

10. The method for managing the file system of claim 1, wherein the allocation areas of space map trees are converted into fixed size areas to provide constant latency for loading logs and creating index trees.

11. A computer program product system for managing a file system, the computer program product system comprising:
   a processor; and
   a non-transitory processor-readable storage medium comprising:
      a) a computer program module configured for execution by the processor to assess a plurality of allocation areas of loaded allocation trees to serve a request per file system drive for a transaction group;
      b) a computer program module configured for execution by the processor to move a loaded allocation tree to an unloading tree in the event the loaded allocation tree will not satisfy the request;
      c) a computer program module configured for execution by the processor to select and place in a loading tree queue a most eligible unloaded tree based on a weight of each unloaded tree, wherein an unloaded tree is independent to a file system device and represents all trees which are not loaded on the given device; and
      d) a computer program module configured for execution by the processor to asynchronously process the loading tree queue and an unloading tree queue threads parallel to a storage pool allocator sync process.

12. The system for managing a file system of claim 11, wherein the plurality of allocation areas of loaded allocation trees is attached in a circular ring configuration.

13. The system for managing a file system of claim 11, wherein a sorted set of unloaded trees, sorted as a function of space map free area, fragmentation level, and a maximum size segment available in a segment, is from where the most eligible unloaded tree is selected.

14. The system for managing a file system of claim 11, wherein allocation areas of space map trees, converted into fixed size areas, provide constant latency for loading logs and creating index trees.

15. A non-transitory processor-readable storage medium comprising one or more instructions which, when executed by at least one processing circuit, cause the at least one processing circuit to manage a file system by:
   a) assessing a plurality of allocation areas including loaded allocation trees to serve a request per file system drive for a next transaction group;

b) moving a loaded allocation tree to an unloading tree in the event the loaded allocation tree will not satisfy the request;
c) selectively placing in a loading tree queue a most eligible unloaded tree based on a weight of each unloaded tree, wherein an unloaded tree is independent to a file system device and represents all trees which are not loaded on the given device; and
d) asynchronously processing the loading tree queue and an unloading tree queue via threads running parallel to a storage pool allocator sync process.

16. The non-transitory processor-readable storage medium of claim 15, wherein the one or more instructions further cause the at least one processing circuit to manage the file system by attaching the loaded allocation trees in a circular ring model.

17. The non-transitory processor-readable storage medium of claim 15, wherein the one or more instructions further cause the at least one processing circuit to manage the file system by sorting an unloaded tree as a function of space map free area, fragmentation level, and a maximum size segment available in a segment.

18. The non-transitory processor-readable storage medium of claim 15, wherein the one or more instructions further cause the at least one processing circuit to manage the file system by converting the allocation areas of space map trees into fixed size areas to provide constant latency for loading logs and creating index trees.

19. The non-transitory processor-readable storage medium of claim 15, wherein the one or more instructions further cause the at least one processing circuit to manage the file system by grouping the allocation areas into space map allocation trees of subsets including unloaded, loading, loaded and unloading trees.

* * * * *